No. 683,310. Patented Sept. 24, 1901.
T. G. MANDT.
HUB ATTACHER.
(Application filed Aug. 13, 1901.)
(No Model.)
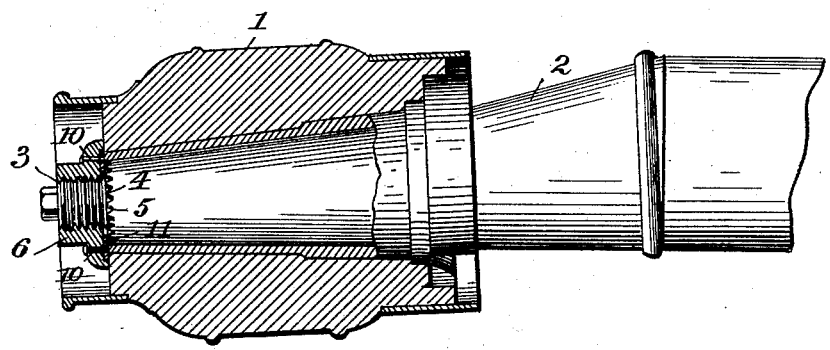
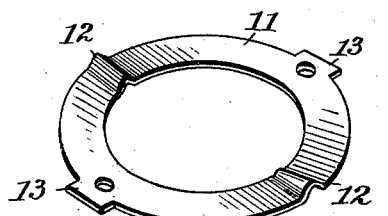
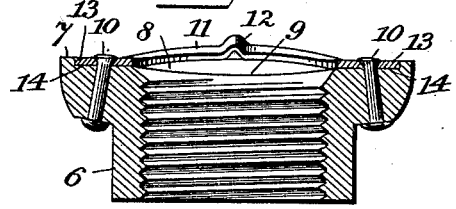
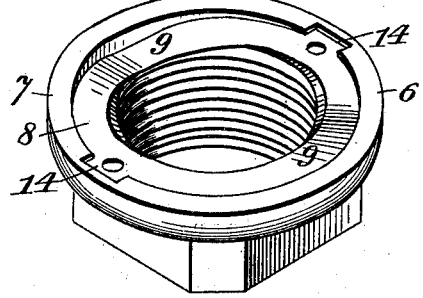
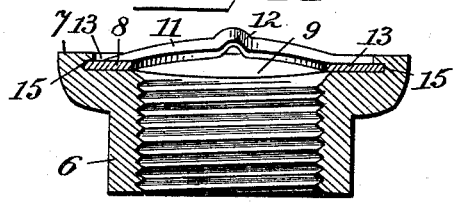
Witnesses:
F. L. Ourand
Frank G. Radelfinger.
Inventor:
Targe G. Mandt,
By Lewis Bagger & Co,
Attorneys.
THE NORRIS PETERS CO., PHOTO-LITHO., WASHINGTON, D. C.

UNITED STATES PATENT OFFICE.

TARGE G. MANDT, OF STOUGHTON, WISCONSIN.

HUB-ATTACHER.

SPECIFICATION forming part of Letters Patent No. 683,310, dated September 24, 1901.

Application filed August 13, 1901. Serial No. 71,949. (No model.)

*To all whom it may concern:*

Be it known that I, TARGE G. MANDT, a citizen of the United States, residing at Stoughton, in the county of Dane and State of Wisconsin, have invented new and useful Improvements in Hub-Attachers, of which the following is a specification.

My invention relates to hub-attachers; and the objects of the same are to construct a device of this character which will securely hold the hub on the axle and not be loosened by backing and which will at the same time be simple in construction and efficient in operation. These objects are accomplished by the simple and novel construction described in this specification and claimed, and illustrated in the accompanying drawings, forming a part thereof, in which—

Figure 1 is a longitudinal vertical section taken through the hub, axle, and nut. Fig. 2 is a perspective of the nut and pawl-bearing washer or locking-ring, the parts being separated. Fig. 3 is a transverse section of the same. Fig. 4 is a modified form of nut and locking-ring.

Like numerals of reference designate like parts in the different views of the drawings.

The numeral 1 designates a hub mounted to turn on a thimble-skein 2. The end of the skein 2 bears a tenon 3, and adjacent thereto is a square shoulder 4, bearing a complete series of radial symmetrically-beveled teeth 5. A nut 6 is fitted on the tenon 3 and is reamed out, forming a rim 7 adjacent to a shoulder 8. The shoulder 8 is scooped out at diametrically opposite points, forming concave recesses 9. Secured by rivets 10 at diametrically opposite points intermediate the recesses 9 is a pawl-bearing washer or holding-ring 11, having rounded pawls 12 thereon, formed by stamping ribs up out of the ring. The ring 11 is resilient and is not plane, but is sprung up in two points, bringing the pawls 12 at the highest point. The pawls 12 are located just over the center of the recesses 9. Lugs 13 on the ring 11 engage notches 14 in the nut 6 and relieve the strain on the rivets 10.

By virtue of the above-described construction when the nut 6 is screwed on the tenon 3 the pawls 12 will engage the teeth 5. The pawls 12 will ride over the teeth 5, and the nut can be given several turns, since the resilient ring 11 permits the pawls to be forced down into the recesses 9. In unscrewing the nut 6 the pawls 12 will again ride over the teeth 5, since they are symmetrical; but owing to the spring action of the ring 11 the pawls will retain their hold on the teeth 5 during several turns of the nut. This makes it impossible to loosen the nut except with the aid of a wrench.

In Fig. 4 is illustrated a modified form of fastener for the ring 11, which comprises slots or recesses 15, within which the lugs 13 can be inserted by slightly buckling or springing the ring 11. This does away with the rivets and securely holds the ring in place.

I do not wish to be limited as to details of construction, as these may be modified in many particulars without departing from the spirit of my invention.

Having described my invention, what I claim as new, and wish to secure by Letters Patent, is—

1. In a hub-attacher, the combination with a skein having a tenon thereon and a shoulder adjacent to said tenon bearing a series of radial symmetrical beveled teeth, of a nut provided with a shoulder having recesses therein, and a spring holding-ring secured to said nut and bearing rounded pawls located over said recesses and constructed to engage said teeth and to be forced to ride over the same, substantially as described.

2. In a hub-attacher the combination with a skein having a tenon thereon and a shoulder adjacent to said tenon bearing a series of radial symmetrically-beveled teeth, of a nut provided with a shoulder having concave recesses therein at diametrically opposite points, and a spring holding-ring secured to said nut and bearing pawls located over said recesses, said ring being sprung to bring said pawls at the highest points.

In testimony whereof I have hereunto set my hand in presence of two subscribing witnesses.

TARGE G. MANDT.

Witnesses:
EDWARD F. CAVERLY,
BENNETT T. JONES.